Aug. 21, 1962 W. F. HANNON 3,050,197
WORK SUPPORTING JIG
Filed Feb. 19, 1960 2 Sheets-Sheet 1
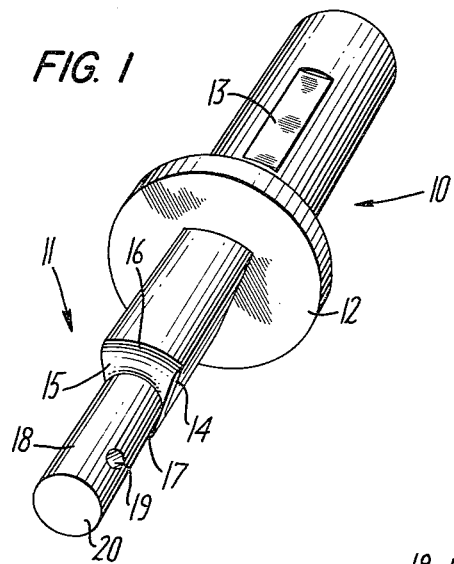
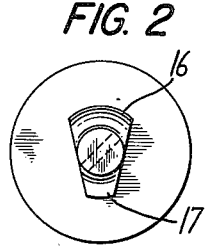
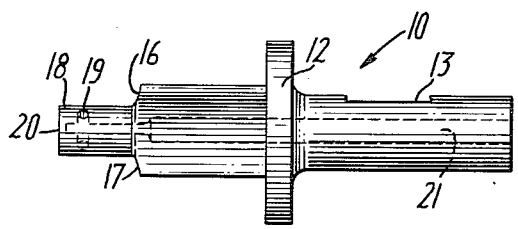
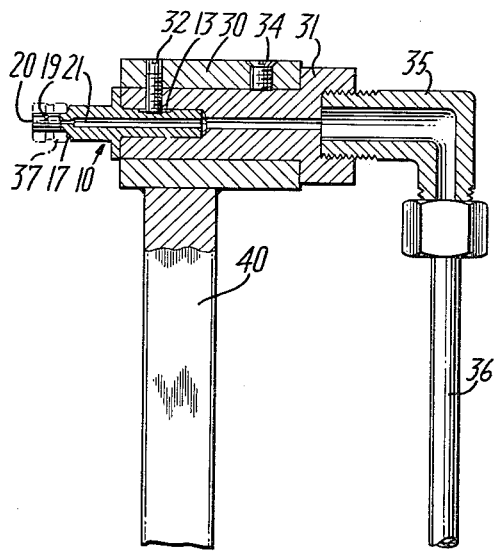
INVENTOR.
WILLIAM F. HANNON
BY
Mitchell & Bechert
ATTORNEYS INVENTOR.
WILLIAM F. HANNON
BY
Mitchell & Bechert
ATTORNEYS

United States Patent Office 3,050,197
Patented Aug. 21, 1962

3,050,197
WORK SUPPORTING JIG
William F. Hannon, Berlin, Conn., assignor to The Fafnir Bearing Company, New Britain, Conn., a corporation of Connecticut
Filed Feb. 19, 1960, Ser. No. 9,886
6 Claims. (Cl. 214—1)

This invention, generally, relates to a jig for attachment on a loading arm to support a workpiece during transportation between two locations and, more particularly, to a jig for removing a small workpiece from a supply at one location and supporting the workpiece during delivery to a work location.

It is an object of this invention to provide a new and improved device for attachment on a loading arm to pick up a small workpiece and support the workpiece during transportation to a work location.

Another object of the invention is to provide a new and improved device for picking up and depositing very small objects.

Generally, one form of the jig of the invention includes a body having an extended portion of suitable dimensions to be received within an opening in a workpiece to be picked up. A channel extending through the body communicates fluid pressure to an opening in the extended portion to hold the workpiece in place during transportation.

The above and other objects and advantages of the invention will become apparent more readily from the following detailed description of one preferred embodiment of the invention taken in conjunction with the accompanying drawings, in which:

FIGS. 1, 2 and 3, respectively, are perspective, end and side views of one form of a jig in accordance with the invention;

FIG. 4 is a view partly in section showing a loading arm with the jig shown in FIGS. 1, 2 and 3 attached thereto;

Figure 5:
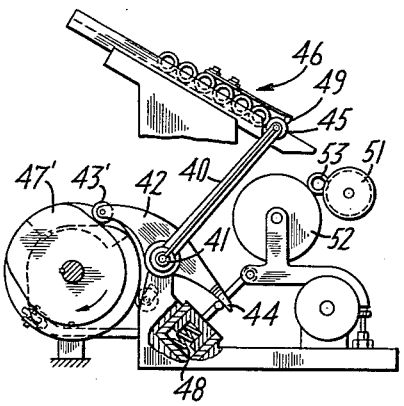
FIG. 5 is a view in elevation partly in section illustrating one operable mechanism for controlling the movement of a loading arm utilizing the jig of the invention.

Referring now to FIGS. 1, 2 and 3 of the drawings, the jig comprising a body 10 is provided with an extended portion 11 along the axial length thereof and a flange 12 extending radially from the body 10 at approximately the midpoint. A flattened surface 13 on the body 10 provides a position against which a set screw can act to retain the device in a loading arm for operation, as will be explained.

On the opposite side of the flange 12 from the flattened area 13, chamfered sides 14 and 15 form top and bottom abutment surfaces 16 and 17, respectively, against which a workpiece is to be held. A cylindrical extended portion 18 is dimensioned suitably to be received within an aperture in a workpiece such as a small bearing ring, as will be explained in greater detail presently.

An aperture 19 is formed diametrically through the extended portion 18 and is located from the end 20 approximately one-third of the total length of the extended portion 18. Communicating with the aperture 19 and extending through the body 10 is a channel 21.

As seen in FIG. 4, the body 10 of the jig is received in an opening 30 of an adapter 31 and is held rigidly therein by a set screw 32 which acts against the flattened surface 13. The adapter 31, in turn, is fixedly mounted on a loading arm 40 by another set screw 34.

A threaded attachment 35 connects the channel 21 and the aperture 19 to a supply of fluid pressure (not shown) delivered through a conduit 36. The conduit 36 is movable with the loading arm 40 and, if desired, may be attached directly thereto.

Although any suitable workpiece having an aperture therein may be supported by the device of the invention, a small bearing ring 37 is shown in dotted lines in FIG. 4 in position to be supported by the jig. Air pressure delivered through the channel 21 and through the aperture 19 escapes axially around the bearing race 37. Due to this air flow, and due to the positioning of the aperture 19 closer to the outer end 20 of the device, the bearing ring 37 is urged against the shoulders 16 and 17.

Figure 6:
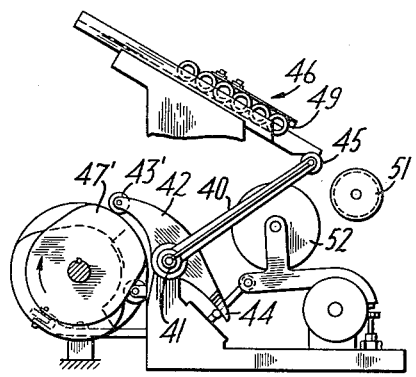
FIG. 6 is a view in elevation similar to FIG. 5 and showing the loading arm in a position of travel.
Figure 7:
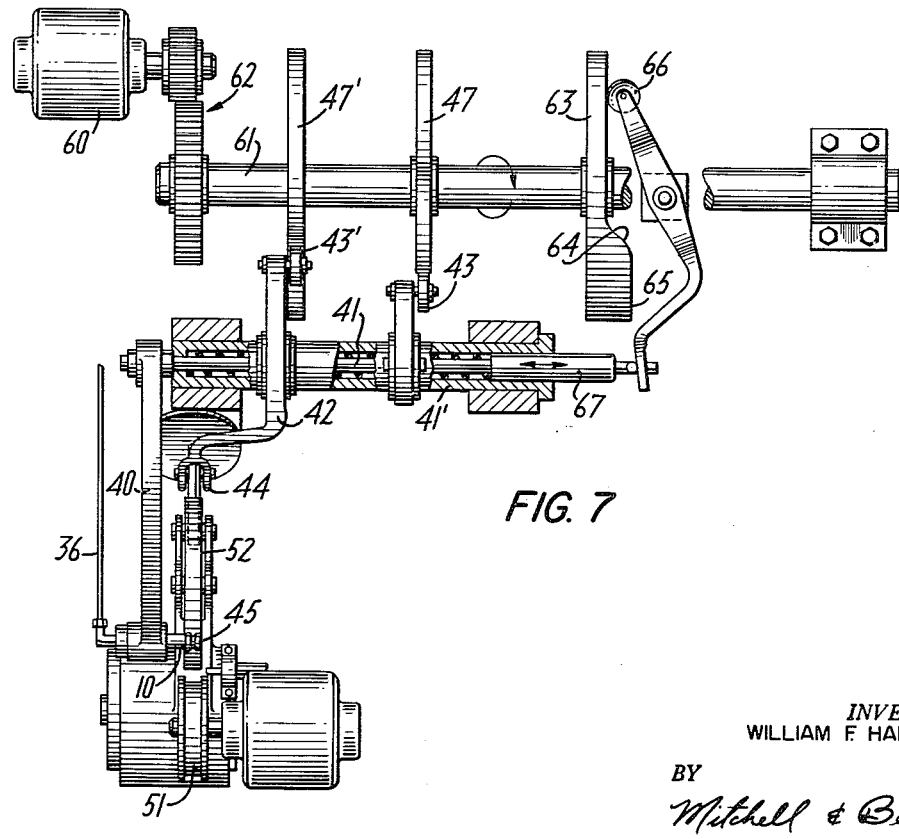
FIG. 7 is a plan view partly in section illustrating one form of a mechanism for moving the loading arm equipped with the device of the invention.

To illustrate one use to which the device of the invention is applicable, a portion of an internal grinding machine is illustrated diagramatically in FIGS. 5, 6 and 7.

Referring now to FIGS. 5, 6 and 7, a loading arm 40 is fixedly attached at one end to a central shaft 41, and a bar 42 is fixedly attached to an outer shaft 41'. The central shaft 41 is slidable axially within the outer shaft 41', and, also, is freely rotatable therein.

A cam 47 fixed to a shaft 61 cooperates with a follower 43 to move the loading arm 40 from a first position as seen in FIG. 5 to deliver a workpiece at a second position (shown by the workpiece 53 in FIG. 5) and back to the first position. The follower 43 is fixed only to the central shaft 41. As each workpiece is removed from a dispenser 46, a retention spring 49 holds the remaining workpieces in place.

One end of the bar 42 which is fixed to the shaft 41' is provided with a follower roller 43' to cooperate with a cam 47' fixed to the shaft 61 while the other end is provided with a bifurcated portion 44, as seen in FIG. 7. As the bar 42 is turned clockwise under the action of cam 47' against the action of spring 48, a roller 52 is moved from a first position adjacent a roller 51 (FIG. 5) to a second position (FIG. 6) which is removed from the roller 51 to permit a workpiece 53 to drop by gravity into a suitable receptacle (not shown). The workpiece 53 in FIG. 5 is shown in position for internal grinding by a suitable means (not shown) and is supported in this position by rollers 51 and 52.

To insert the extended portion 18 of the jig within the aperture of a workpiece, the loading arm 40 must be moved laterally. Therefore, a mechanism is shown in FIG. 7 as illustrative of one arrangement for achieving this movement.

Referring now particularly to FIG. 7 a suitable motor 60 turns the shaft 61 through gears 62. Also keyed to the shaft 61 is a cam 63 having a lateral inclined 64 and a laterally extended surface 65. As the cam 63 turns, a follower roller 66 rides up the incline 64 to move the center shaft 41 to the left, as viewed in FIG. 7.

The loading arm 40 being attached to the center shaft 41, thus, is displaced to the left, and when the jig is in position to be inserted within the aperture of a workpiece 45, the center shaft 41 and the loading arm 40 are moved back to the right, as viewed in FIG. 7.

Of course, the device of the invention may be used with other and different mechanisms if desired, the internal grinding machine described above being merely illustrative of one application of the invention.

While one form of the invention has been described and illustrated above, it is understood that modifications may be made by those skilled in the art without departing from the true spirit and scope of the invention as set forth in the following claims.

I claim:
1. A jig for attachment on a loading arm to support a workpiece during transportation between two locations comprising a body portion adapted to be attached on the loading arm, an extended portion on said body portion to be received within an aperture in the workpiece, the extended portion having an opening therethrough at a predetermined position relative to the longitudinal axis of the body portion so that a workpiece positioned on said extended portion is urged further onto said extended portion by a fluid flow through said opening, and a channel extending through the body portion to communicate a source of fluid pressure with the opening.

2. A jig for attachment on a loading arm to support a workpiece during transportation between two locations comprising a body portion adapted to be attached on the loading arm, a flange extending radially from said body portion to position the body portion accurately on the loading arm, an extended portion on said body portion to be received within an aperture in the workpiece, the extended portion having an opening therethrough at a predetermined position relative to the longitudinal axis of the body portion so that a workpiece positioned on said extended portion is urged further onto said extended portion by a fluid flow through said opening, and a channel extending through the body portion to communicate a source of fluid pressure with the opening.

3. A jig for attachment on a loading arm to support a workpiece during transportation between two locations comprising a body portion adapted to be attached on the loading arm, first flange means extending radially from said body portion to position said body portion accurately on the loading arm, an extended portion on said body portion to be received within an aperture in the workpiece, second flange means adjacent said extended portion to limit the penetration of the extended portion within the aperture of the workpiece, the extended portion having an opening therethrough at a predetermined position relative to the longitudinal axis of the body portion so that a workpiece positioned on said extended portion is urged further onto said extended portion by a fluid flow through said opening, and a channel extending through the body portion to communicate a source of fluid pressure within the opening.

4. A jig for attachment on a loading arm to support a workpiece during transportation between two locations comprising a body portion adapted to be attached on the loading arm, an extended portion on said body portion to be received within an aperture in the workpiece, flange means on said body portion adjacent said extended portion, the extended portion having an opening therethrough at a predetermined position relative to the longitudinal axis of the body portion so that a workpiece positioned on said extended portion is urged further onto said extended portion by a fluid flow through said opening, and a channel extending through the body portion to communicate a source of fluid pressure with the opening.

5. A jig for attachment on a loading arm to support a workpiece during transportation between two locations comprising a body portion adapted to be attached on the loading arm, an extended portion on said body portion to be received within an aperture in the workpiece, the extended portion having an opening therethrough at a predetermined position relative to the longitudinal axis of the body portion so that a workpiece positioned on said extended portion is urged further onto said extended portion by a fluid flow through said opening, a channel extending through the body portion to communicate a source of fluid pressure with the opening, and means to fixedly attach said body portion to a loading arm for movement therewith.

6. A jig for attachment on a loading arm to support a workpiece during transportation between two locations comprising a body portion adapted to be attached on the loading arm, first flange means on the body portion to position said body portion accurately on the loading arm, an extended portion extending axially on said body portion to be received within an aperture in the workpiece, second flange means on said body portion adjacent the extended portion, the extended portion having an opening extending radially therethrough at a point from the outermost end of the extended portion approximately one-third the length of said extended portion so that a workpiece positioned on said extended portion is urged further onto said extended portion by a fluid flow through said opening, a channel extending axially through the body portion to communicate a source of fluid pressure with the opening, and means to fixedly attach said body portion to the loading arm for movement therewith.

References Cited in the file of this patent

UNITED STATES PATENTS

| | | |
|---|---|---|
| 1,688,424 | Kieffer | Oct. 23, 1928 |
| 2,578,329 | Von Hoffe | Dec. 11, 1951 |
| 2,701,736 | Heppenstall | Feb. 8, 1955 |
| 2,777,602 | Genich | Jan. 15, 1957 |